United States Patent [19]

Flammer

[11] Patent Number: 5,007,052
[45] Date of Patent: Apr. 9, 1991

[54] METHOD FOR ROUTING PACKETS BY SQUELCHED FLOODING

[75] Inventor: George Flammer, San Jose, Calif.
[73] Assignee: Metricom, Inc., Campbell, Calif.
[21] Appl. No.: 337,031
[22] Filed: Apr. 11, 1989
[51] Int. Cl.[5] .............................................. H04J 3/26
[52] U.S. Cl. .................................. 370/85.6; 370/94.3
[58] Field of Search ................. 370/17, 60, 60.1, 62, 370/94.1, 94.2, 94.3, 85.6

[56] References Cited

U.S. PATENT DOCUMENTS

| | | | |
|---|---|---|---|
| 4,760,572 | 7/1988 | Tomikawa | 370/94.1 |
| 4,864,559 | 9/1989 | Perlman | 370/60 |
| 4,920,529 | 4/1990 | Sasaki et al. | 370/60 |

Primary Examiner—Douglas W. Olms
Assistant Examiner—Melvin Marcelo
Attorney, Agent, or Firm—Townsend and Townsend

[57] ABSTRACT

A technique is provided whereby broadcast or flooding packets received at a node are only rebroadcast if specific criteria are met. The criteria are based on a packet routing protocol wherein sequence information is maintained at each node on a link basis for each received packet and wherein received packets are rebroadcast only to other nodes with low sequence numbers. Each node maintains information on each other node within its communication range and assigns a link sequence number to the linked node at the time of the first exchange of a link information packet. Each node works backwards from the information sent to it to determine which other nodes should receive rebroadcast packets. In a packet flooding situation, a node rebroadcasts a flooding packet only to those other nodes which have low sequence numbers or for which the rebroadcasting node is a low sequence number of the other node.

8 Claims, 2 Drawing Sheets

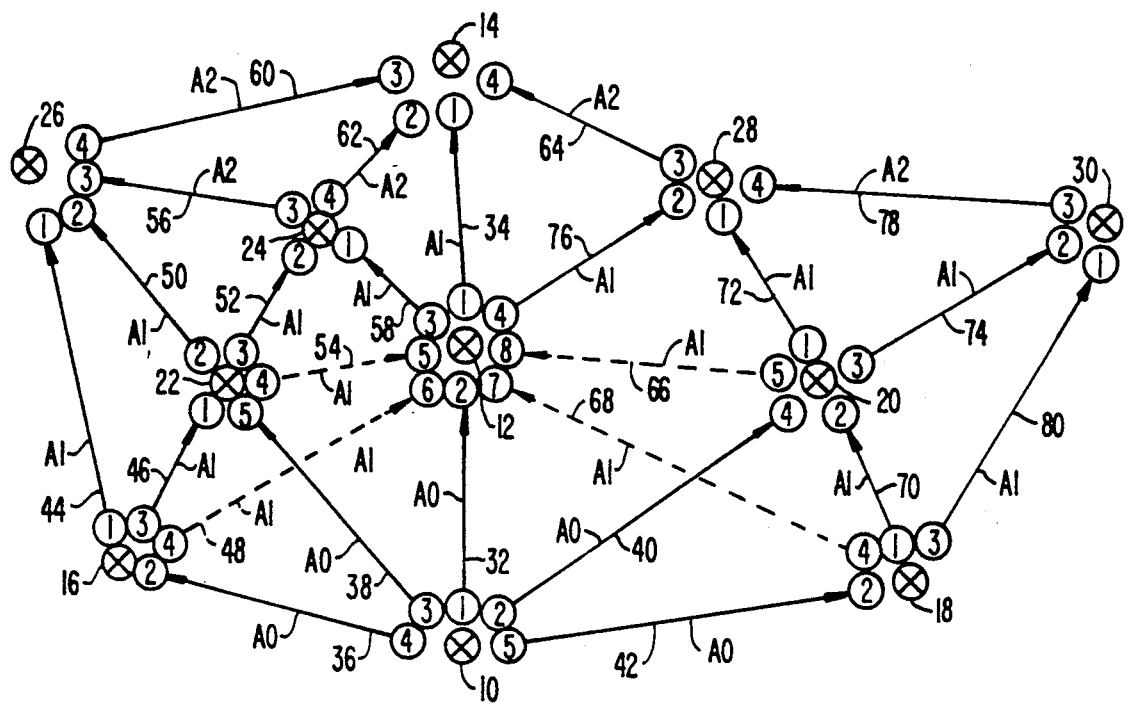
FIG._1.
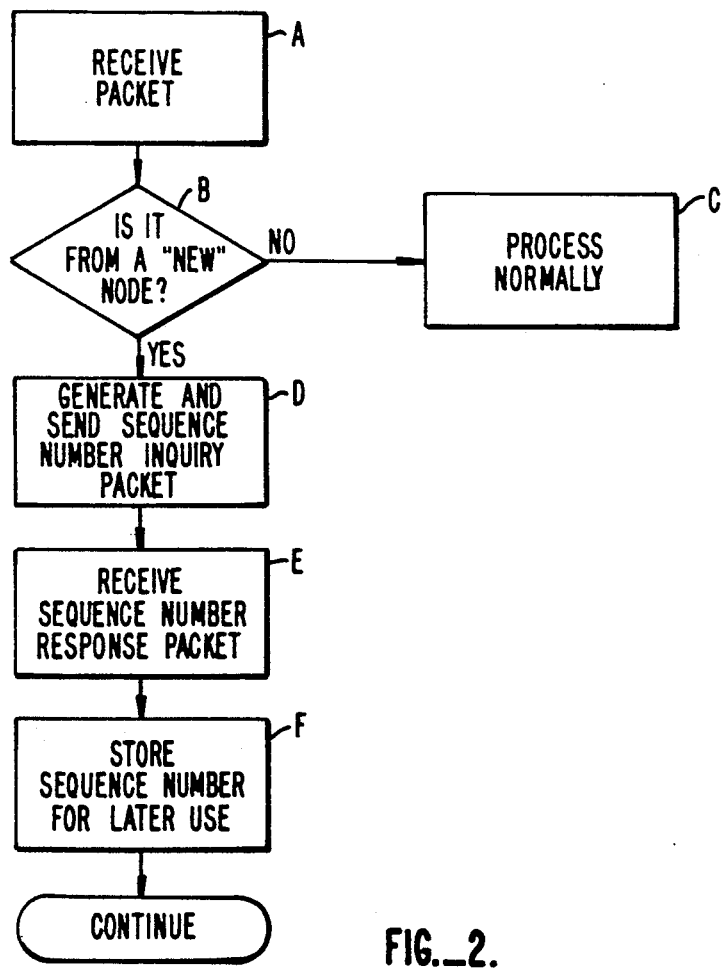
FIG._2.

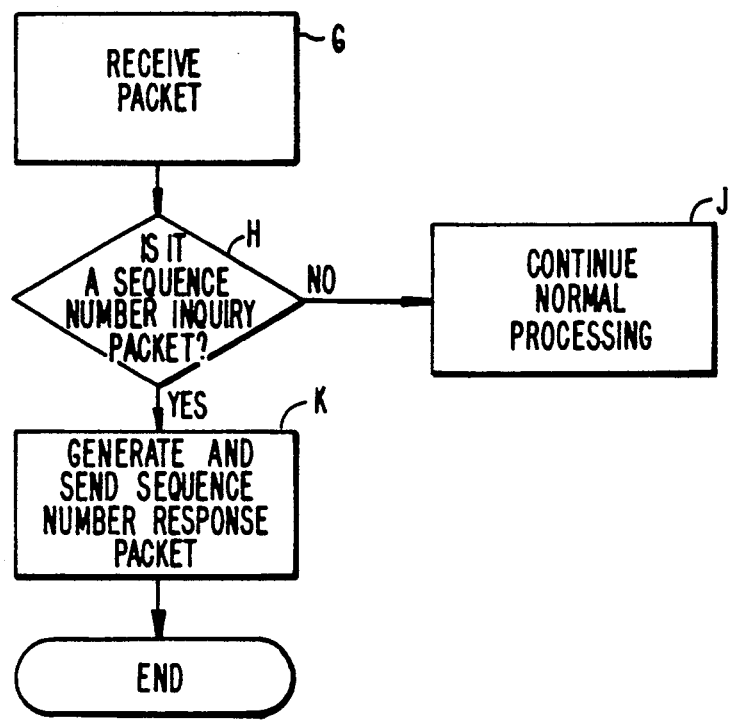
FIG._3.
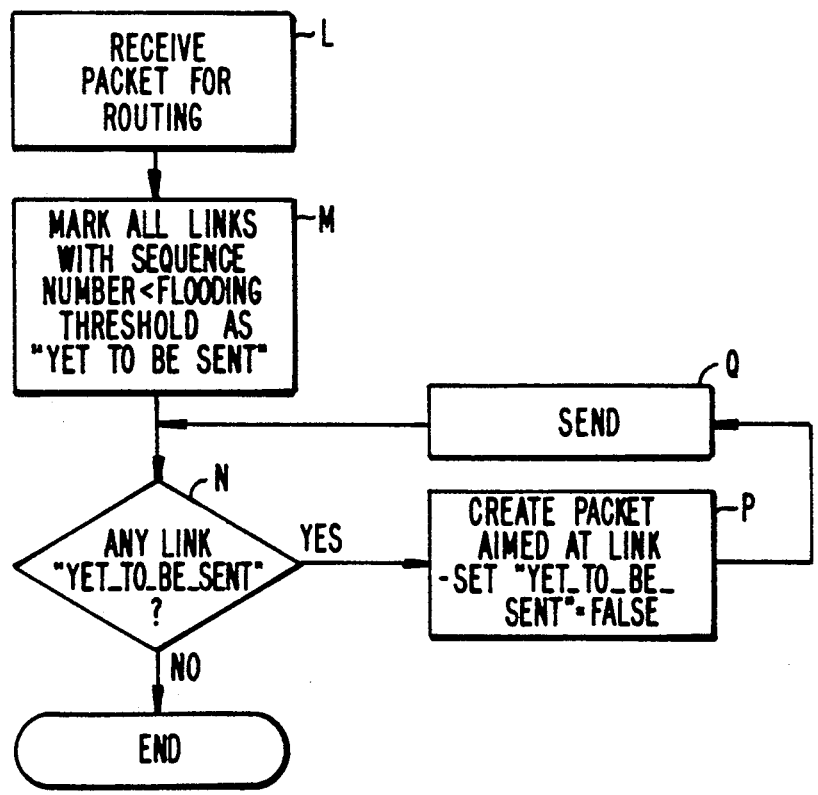
FIG._4.

METHOD FOR ROUTING PACKETS BY SQUELCHED FLOODING

BACKGROUND OF THE INVENTION

This invention relates to packet communications and more specifically to a method for routing large numbers of packets in a complex packet switched communications network.

One of the applications for a packet switched communications network, particularly a radio broadcast network, is remote polling of large numbers of stations or nodes at arbitrary locations. A specific application is the remote reading of electric power meters in a large metropolitan area wherein each meter is separately addressable. Such a network may comprise many millions of nodes. Heretofore, there never has been a network of such size and complexity.

Unlike a central-office-switched system, such as the telephone system, packet-switched systems do not rely on a central control. Consequently, successful communication of packets between nodes is a function of contention. Success is inversely proportional to the volume of traffic on a channel. Contention makes conventional packet switching techniques particularly difficult to use in to broadcast a message to all nodes in a large network.

The conventional packet routing protocol used to broadcast a message to all nodes of a network is the "flooding sink" algorithm. Under the flooding sink algorithm, a packet is broadcast by a source in all directions to all nodes within a reception region of the source, and then each of the receiving nodes rebroadcasts the packet in all directions to all nodes with each of their individual reception regions. The protocol can be compared to ripples in a pond caused by the splash of a single stone which in turn cause further ripples from objects on the surface of the pond. This process repeats until all nodes have received a second copy of the packet, and all copies of the packet cease circulating.

One technique used to suppress the circulation of a packet is to prevent a node from rebroadcasting a packet if the packet has been received previously. Hence, once all the nodes have received two copies of the same packet, the packet ceases to circulate.

The flooding protocol works well in a sparsely-populated network. Recirculation of the same packet on such a system does not overload the network. However, if there are more than a few hundred nodes in a network, the contention problem among recirculating packets can and will cause a communication overload and cause an effective breakdown of a packet network.

Two solutions other than the current invention have been suggested to solve the overload problem in a large network. The first suggested solution is to selectively but randomly address a small group of nodes in a reception region. While this reduces the number of packets in circulation, it also runs counter to the intention to broadcast a packet throughout a network without addressing an underlying problem, as explained hereinafter. The second suggested solution is to have the source node poll each node and to address each node individually. However, such an approach creates more overhead in managing information than the information it manages. In a large network, management information may well overwhelm message information.

The tradeoff between omnidirectional flooding with its chaotic information propagation and polling with its bureaucratic management overhead, each of which causing eventual overload of network, presents a heretofore unsolved dilemma for the designer of a large network. The desire is to provide a protocol with low management overhead which kills unneeded recirculating packets while providing for timely arrival of all packets of a message and which does not cause a fission of management problems.

SUMMARY OF THE INVENTION

According to the invention, there is provided a technique whereby broadcast or flooding packets received at a node are only rebroadcast if specific criteria are met. The criteria are based on a packet routing protocol wherein sequence information is maintained at each node on a link basis for each received packet and wherein received packets are rebroadcast only to other nodes through a communication link which is assigned a sufficiently high priority, that is, through links assigned sufficiently low sequence numbers. Each node has sufficient intelligence to maintain information on each other node within its communication range and to assign a link sequence number to the linked node at the time of the first exchange of a link information packet. Each node works backwards from the information sent to it to determine which other nodes should receive rebroadcast packets. In a packet flooding situation, a node rebroadcasts a flooding packet only to those other nodes which have low sequence numbers or for which the rebroadcasting node is related by a low sequence number of the other node. The protocol may be further modified by directing that flooding packets can only be rebroadcast away from the source node to other nodes, that is, to nodes which are located in the far half-circular region bisected by an axis between the source node and the intermediate rebroadcasting node.

The invention will be better understood upon reference to the following detailed description and to the drawings.

BRIEF DESCRIPTION OF THE DRAWINGS

FIG. 1 is a schematic diagram of a grid of packet nodes illustrating propagation of a single packet through a network according to the invention.

FIG. 2 is a flow chart illustrating operation of sequence number acquisition according to the invention.

FIG. 3 is a flow chart illustrating operation of sequence number response according to the invention.

FIG. 4 is a flow chart illustrating the flooding decision according to the invention.

DETAILED DESCRIPTION OF SPECIFIC EMBODIMENTS

Referring now to FIG. 1, there is a shown a grid of packet nodes 10, 12, 14, 16, 18, 20, 22, 24, 26, 28, and 30. Each of the nodes is represented by a circle around a cross or X. At each node in a packet system, a terminal node controller (not shown) is provided having independent processing and memory capabilities.

Between selected nodes there are links 32, 34, 36, 38, 40, 42, 44, 46, 48, 50, 52, 54, 56, 58, 60, 62, 64, 66, 68, 70, 72, 74, 76, 78, and 80. The links are represented by either solid lines or broken lines, the significance of which will be explained hereinafter. Each link is also shown with a directional arrowhead, indicative of preferred propagation direction, as explained hereinafter. At the terminations of each link there is a number in a circle. The circled numbers represent a link sequence for the associated node and link. A link sequence is the number assigned by the node to each link with each other node within its communication range.

According to the invention, each local node rebroadcasts a flooding packet only to those remote nodes which consider the local node of a priority higher than a preselected threshold, that is, a priority assigned by the remote node to the local node which is a low link sequence (eg., 1, 2, or 3). The nodes each exchange information via packets at the beginning of communication between nodes whereby the nodes advise each other of the link sequence number for &.he established link. For example, each node in FIG. 1 has links with other nodes having the following link sequences. An asterisk indicates that, under global flooding, a flooding packet will be rebroadcast via the link between the two listed nodes on the listed links (unless the remote node is the source node): In the Table below, the local link sequence is the priority assigned by the local node to the link to the remote node, and the remote link sequence is the priority assigned by the remote node to the link with the local node.

TABLE I

| NODE | LOCAL LINK SEQUENCE | TO NODE | REMOTE LINK SEQUENCE | LINK NO. |
|---|---|---|---|---|
| 10* | 1 | 12 | 2 | 32 |
| 10* | 2 | 20 | 4 | 40 |
| 10* | 3 | 22 | 5 | 38 |
| 10* | 4 | 16 | 2 | 36 |
| 10* | 5 | 18 | 2 | 42 |
| 12* | 1 | 14 | 1 | 34 |
| 12* | 2 | 10 | 1 | 32 |
| 12* | 3 | 24 | 1 | 58 |
| 12* | 4 | 28 | 2 | 76 |
| 12 | 5 | 22 | 4 | 54 |
| 12 | 6 | 16 | 4 | 48 |
| 12 | 7 | 18 | 4 | 68 |
| 12 | 8 | 20 | 5 | 66 |
| 14* | 1 | 12 | 1 | 34 |
| 14* | 2 | 24 | 4 | 62 |
| 14* | 3 | 26 | 4 | 60 |
| 14* | 4 | 28 | 3 | 64 |
| 16* | 1 | 26 | 1 | 44 |
| 16* | 2 | 10 | 4 | 36 |
| 16* | 3 | 22 | 1 | 46 |
| 16 | 4 | 12 | 6 | 48 |
| 18* | 1 | 20 | 2 | 70 |
| 18* | 2 | 10 | 5 | 42 |
| 18* | 3 | 30 | 1 | 80 |
| 18 | 4 | 12 | 7 | 68 |
| 20* | 1 | 28 | 1 | 72 |
| 20* | 2 | 18 | 1 | 70 |
| 20* | 3 | 30 | 2 | 74 |
| 20* | 4 | 10 | 2 | 40 |
| 20 | 5 | 12 | 8 | 66 |
| 22* | 1 | 16 | 3 | 46 |
| 22* | 2 | 26 | 2 | 50 |
| 22* | 3 | 24 | 2 | 52 |
| 22 | 4 | 12 | 5 | 54 |
| 22* | 5 | 10 | 3 | 38 |
| 24* | 1 | 12 | 3 | 58 |
| 24* | 2 | 22 | 3 | 52 |
| 24* | 3 | 26 | 3 | 56 |
| 24* | 4 | 14 | 2 | 62 |
| 26* | 1 | 16 | 1 | 44 |
| 26* | 2 | 22 | 2 | 50 |
| 26* | 3 | 24 | 3 | 56 |
| 26* | 4 | 14 | 3 | 60 |
| 28* | 1 | 20 | 1 | 72 |
| 28* | 2 | 12 | 4 | 76 |
| 28* | 3 | 14 | 4 | 64 |
| 28* | 4 | 30 | 3 | 78 |
| 30* | 1 | 18 | 3 | 80 |
| 30* | 2 | 20 | 3 | 74 |
| 30* | 3 | 28 | 4 | 78 |

Link sequence assignments may be assigned in the order that links are established at a node. The first link established is assigned the lowest link sequence. Alternative assignments may be made without departing from the scope of the invention, such as a link sequence number based on experience in the quality of the communication link.

Flooding protocols may be modified to limit directionality. For example, a flooding protocol may limit rebroadcast to directions away from the source node, or more precisely to directions in the semicircle opposing the source link. Still further, flooding protocols may limit flooding to compass directions relative to a primary source. Hence in FIG. 1, the direction of propagation of a flooding packet "A" is generally northward (up the page) from node 10, that is, without any southward component, as indicated by the arrows at one end of each link.

FIG. 1 illustrates the propagation of a single flooding packet "A", wherein the number of links is indicated by a suffix. The packet A0 indicates the first link, the packet A1 is the first rebroadcast of the packet A0, and the packet A2 is the second rebroadcast of the packet A0. Each of the packets are identical except for local (node-to-node) addressing. The standard acknowledgement employed with packet protocols may be used to confirm receipt of a packet.

While many links are established between nodes, only a selected number of links are employed to rebroadcast flooding packets. Unused links under flooding of packets are shown as broken lines in FIG. 1 in a protocol where the highest allowable link sequence is 3 at both the local node and the remote node. The redundancy of such an arrangement will be apparent. Nevertheless, the protocol eliminates recirculating packets.

The links shown in FIG. 1 are simple one-hop links. More complex links could also be defined through intermediate nodes. Complex links may be assigned link sequences in the same manner as simple links.

Directionality of a flooding packet is established by limiting rebroadcast to nodes away from the source node. Depending upon the design of the network, directionality can be established by a knowledge of the position of the source node. This is most easily done by imbedding the coordinate location of the source node in the address of the originating source node. This allows the local node to calculate compass direction based on its knowledge of its own location and the location of remote nodes with which it has a communication link. An imaginary axis through the originating source node (10 of FIG. 1) and the first intermediate node 12 may serve as a baseline.

FIG. 2 is a flow chart illustrating operation of sequence number acquisition according to the invention. This operation occurs within a terminal node controller in each node. The first step is to receive a packet (Step A). Thereafter the packet is tested to determine whether the packet is from a node not heard from before (Step B). If it is from a known node, then the packet is processed normally (Step C). If it is from a new node, then the terminal node controller generates a sequence number inquiry packet and sends it to the destination from which the packet was received (Step D). Sometime later the sequence number response packet is received from the new node (Step E). The sequence number response packet contains the sequence number of the local node which has been assigned to it by the new node. The local node then stores that sequence number for later use (Step F).

FIG. 3 is a flow chart illustrating operation of the sequence number response procedure according to the invention. This procedure is executed at the terminal node controller of any node to determine if a sequence number response packet is to be sent out. First, the terminal node controller receives and decodes a packet (Step G). The packet is then tested to determine if it is a sequence number inquiry packet (Step H). If it is not, then the terminal node controller continues normal processing (Step J). However, if it is, then the terminal node controller generates and sends out its sequence number response packet bearing the sequence number for the requesting node (Step K). The sequence number may be determined by maintaining a counter of the number of sequence number inquiry packets which the node has received.

In a preferred embodiment of the invention, the sequence numbers assigned by remote nodes to the local node are used by the terminal node controller of the local node to help decide whether the local node should send a flooding packet to the remote node via the link common to the two nodes. If the sequence number is low, then the local node recognizes that it is one of the few nodes capable of communicating with that remote node, and it uses that knowledge to add that remote node to its destination address list for flooding packets. If the sequence number is high, then the local node recognizes that many other nodes have prior contact with that remote node, and it uses that knowledge to omit that remote node from its destination address list for flooding packets.

FIG. 4 is a flow chart illustrating the flooding decision according to the invention. First, the terminal node controller of the local node receives a packet which requires routing (Step L). It marks as "yet to be sent" all its links having a sequence number less than a preselected value intended to indicate flooding-threshold (Step M). Thus, links with low sequence numbers are flagged. The terminal node controller then tests the links to determine if a link is in a "yet to be sent" state (Step N). If it is, the terminal node controller creates a packet "aimed" at the link, intended for the remote node and sets the flag marked "yet to be sent" as false (Step P). The targeted flooding packet is then sent (Step Q). The link test (Step N) is repeated until all "yet to be sent" links have been accounted for.

The above procedures are readily implemented in an appropriate computer program. For example, a sample of coding employed to make the decision whether to transmit a packet to a specific node follows:

The following is 'routing' and 'routing support'

```
#include"net.h"
#include"platform.h"
#include"utils.h"
static unsigned char conFILE[] = __FILE__;
static unsigned char conDATE[] = __DATE__;
static unsigned char conTIME[] = __TIME__;
void PrideL3LanWan() { nprintf( "%s %s  n", conFILE,
conDATE, conTIME ) ; }
```

The following is 'routing' and 'routing support'

```
LAYER_3_DATA l3_dat ;
LAYER_3_DATA *l3_dp() { return( &l3_dat ) ; } /* end of
'l3_dp()' */
L3_PID GetNewPid() { while( ! ++l3_dat.pid ) ; return
l3_dp()->pid ;}
/* *******************ROUTING***************** */
/* called with all ineligible NODEs DisQualified */
static NODE *
ttell(num)
unsigned int num ;
{
    register int i ;
    register NODE *np ;
    for ( i = 0, np = nt_start(); i < NUM_NODES; np++,
i++)
            if( np->in_the_running )
                if( np->rcvd_info.seq_num <= num
                    || np->sent_seq_num <=num )
                        return np ;
    return NULLNP ;
} /* end of 'tell(num)' */
NODE *most_qualified( dev_dest_ptr, mood )
DEV_ADDR*dev_dest_ptr ;
L3_MOOD         mood
```

The following code is employed to determined the sequence and number for a node:

```
LOCAL UTEXT        seq_num[num_nodes] ;
UCOUNT sequence_number( NSUBNET net )
{
FAST ARG i ;
FAST NODE          *np ;
UTEXT              *seq_num_ptr ;
(VOID) memset(seq_num, (UTEXT)10, NumNodes) ;
for( i = 0, np=nt; i <=Max_Node_in_Use; np++, i++)
        if( ActiveNode(np, net) }
            seq_num[np-> sent_seq_num] = 1 ;
for( seq_num_ptr = seq_num + 1, i = 1;
i = <= Max_Node_In Use + 1; seq_num_ptr++, i++)
            if( *seq_num_ptr == (TINY)0 )
                    return i ;
/* node table is full */
return NumNodes ;
} /* end of 'sequence_number(net)' */
``` while the system has been described in order to illustrate the preferred embodiments, variations and modifications to the herein described system within the scope of the invention, would undoubtedly suggest themselves to those skilled in the art. Accordingly, the foregoing description should be taken merely as illustrative and the invention should be limited only in accordance with the accompanying claims.

I claim:

1. In a packet-switched communication network, a method for routing flooding packets to nodes in said network, said method comprising the steps of:
   assigning at each local node a link sequence value to each communication link with said local node;
   exchanging between each said local node and each remote nodes said link sequence value assigned to a common communication link such that each said local node is advised of the link sequence value assigned by each remote node to a communication link with said local node; and
   transmitting flooding packets only via communication links having link sequence values with a priority above a link sequence value threshold.

2. The method according to claim 1 further including the step of directing that flooding packets can only be rebroadcast away from a source node to other nodes to avoid resending packets into the source node.

3. The method according to claim 2 wherein said directing step includes directing that flooding packets be directed to nodes which are located in the far half-circular region bisected by an axis between the source node and an intermediate rebroadcasting node.

4. In a packet-switched communication network having independent nodes capable of communicating via communication links, a method for routing flooding packets to nodes in said network, said method comprising the steps of:

receiving a packet at a local node from a remote node via a communication link;

testing said packet to determine whether said packet originates from a new node, said new node being said remote node having no communication link established with said local node;

sending from said local node to said new node a sequence number inquiry via said communication link to inquire of a sequence number assigned by said new node to said local node for said communication link;

assigning at said new node a sequence number to said communication link established with said new node, said sequence number specifying a relative priority of communication via said communication link; thereafter receiving from said new node at said local node a sequence number response, said sequence number response comprising said sequence number;

storing said sequence number at said local node;

receiving at said local node a flooding packet, said flooding packet being a message intended for all nodes in said packet network; and retransmitting said flooding packet to said new node only if said sequence number has a higher priority than a preselected threshold for a link sequence.

5. The method according to claim 4 wherein said assigning step comprises assigning said link sequence in the order that links are established.

6. The method according to claim 5 wherein the lowest link sequence number is assigned to the first communication link which is established between the remote node and the local node.

7. The method according to claim 4 further including the step of directing that a flooding packet can only be rebroadcast away from a source node in order to avoid resending packets into the source node.

8. The method according to claim 7 wherein said directing step includes directing that a flooding packet be directed to nodes which are located in the far half-circular region bisected by an axis between the source node and said local node serving as an intermediate rebroadcasting node.

* * * * *